United States Patent
LaTour (10) Patent No.: US 8,650,541 B2
(45) Date of Patent: Feb. 11, 2014

(54) GRAPHICAL MOTION COMPOSITION FILES AND METHODS FOR FORMATTING AND ORGANIZATION THEREOF

(75) Inventor: Pierre-Olivier LaTour, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 2002 days.

(21) Appl. No.: 11/462,667

(22) Filed: Aug. 4, 2006

(65) Prior Publication Data

US 2008/0028918 A1  Feb. 7, 2008

(51) Int. Cl.
 G06F 9/44 (2006.01)
 G06F 17/30 (2006.01)

(52) U.S. Cl.
 USPC .......... 717/121; 717/109; 717/113; 707/825; 707/830

(58) Field of Classification Search
 None
 See application file for complete search history.

(56) References Cited

U.S. PATENT DOCUMENTS

| | | | | |
|---|---|---|---|---|
| 5,557,724 | A * | 9/1996 | Sampat et al. | 725/43 |
| 6,519,764 | B1 * | 2/2003 | Atkinson et al. | 717/120 |
| 6,931,603 | B2 * | 8/2005 | Boegelund | 715/846 |
| 7,062,752 | B2 * | 6/2006 | Simpson et al. | 717/120 |
| 7,114,146 | B2 * | 9/2006 | Zhang et al. | 717/106 |
| 7,376,946 | B2 * | 5/2008 | Nakada et al. | 717/174 |
| 7,448,022 | B1 * | 11/2008 | Ram et al. | 717/120 |
| 7,634,739 | B2 * | 12/2009 | McCrossan et al. | 715/810 |
| 7,663,048 | B2 * | 2/2010 | Kaburagi et al. | 84/609 |
| 7,783,615 | B1 * | 8/2010 | Compton et al. | 707/694 |
| 7,805,470 | B2 * | 9/2010 | Armangau et al. | 707/822 |
| 2001/0023450 | A1 * | 9/2001 | Chu | 709/231 |
| 2003/0098877 | A1 * | 5/2003 | Boegelund | 345/730 |
| 2006/0272484 | A1 * | 12/2006 | Kaburagi et al. | 84/609 |
| 2007/0067336 | A1 * | 3/2007 | Horany | 707/102 |
| 2007/0094636 | A1 * | 4/2007 | Allen et al. | 717/100 |
| 2007/0143750 | A1 * | 6/2007 | Varela et al. | 717/174 |
| 2007/0180404 | A1 * | 8/2007 | Gandolph et al. | 715/825 |

OTHER PUBLICATIONS

Di Yao, Specification and Implementation of Autonomic Fault-Mitigation Behaviors for Large-Scale Real-Time Embedded Systems, published by Vanderbilt University, 2005, pp. 1-69.*
Anton Jansen, Feature based composition, retrieved online [http://citeseerx.ist.psu.edu/viewdoc/download?doi=10.1.1.13.1153&rep=rep1&type=pdf.], published 2002, pp. 1-69.*
International Search Report and Written Opinion for PCT/US2007/073335, mailed Feb. 15, 2008, 10-pgs.

(Continued)

*Primary Examiner* — Tuan Q. Dam
*Assistant Examiner* — Zheng Wei
(74) *Attorney, Agent, or Firm* — Wong, Cabello, Lutsch, Rutherford & Brucculeri, LLP (57) ABSTRACT

A method and data structure for improving the utility of graphics compositions is disclosed. In one embodiment, composition files are created through the connection of patches in a composition editor. Automatically included with the created composition file is protocol information. Preferably such protocol information is included as metadata in the header of the composition file, and can be constructed in any suitable fashion. So constructed, composition files can be grouped together in a physical or virtual repository accessible to other application programs. Another user can then pick an appropriate composition for a new project based on review and filtering of the protocols as contained in the header information of the repositoried composition files. Such review and filtering can be accomplished using a composition picker user interface in the user's application program. The repository can then be queried for composition files matching or otherwise compatible with the specified protocol.

34 Claims, 5 Drawing Sheets

(56) References Cited

OTHER PUBLICATIONS

Villacis J. et al.; "CAT: A High Performance, Distributed Component Architecture Toolkit for the Grid;" The Eighth Int'l. Symposium on High Performance Distributed Computing (CAT. No. 99TH8469) Aug. 3, 1999; IEEE Comput. Soc., XP010358677, Aug. 6, 1999; pp. 125-132.

Konstantinides, K. et al.; "The Khoros Software Developement Environment for Image and Signal Processing;" IEEE Transactions on Image Processing, vol. 3, No. 3, May 1999, pp. 243-252.

"LSA CAT Demo," obtained from http://www.extreme.indiana.edu/cat/about/index.html, dated Jan. 23, 1999, p. 1-8.

"About the CAT," obtained from http://www.extreme.indiana.edu/cat/about/index.html, dated Jan. 27, 2000, p. 1.

"A Resource Information Service for the Component Architecture Toolkit by Andrew Whitaker," obtained from http://www.extreme.indiana.edu/cat/ris/index.html, dated Feb. 18, 1999, p. 1-11.

Randall Bramley, et al., "Using the Grid to Support Software Component Systems," Dept. of Computer Science, Indiana University, undated, p. 1-11.

"SC'98 High Performance Computing Challenge—Industrial Mold Filling Simulation Using an Internationally Distributed Software Component Architecture," obtained from http://www.extreme.indiana.edu/sc98/sc98.html, dated Feb. 17, 1999, p. 1-3.

Dennis Gannon, et al., "The Linear System Analyzer," the Dept. of Computer Science, Indiana University, undated, p. 1-16.

"Web Image—Component Process Log Splib," obtained from http://www.extreme.indiana.edu/cat/screenshots/splibwebpg.jpg, generated Oct. 6, 2009, p. 1.

"Web Image—Connecting "sparseSystem" on 'BasicInfo 1' to "sparseSystem" on 'Splib 6'," obtained from http://www.extreme.indiana.edu/cat/screenshots/allconnected.jpg, generated Oct. 6, 2009, p. 1.

"Web Image—Parameter Settings, Output Ports," obtained from http://www.extreme.indiana.edu/cat/screenshots/params.gif, generated Oct. 6, 2009, p. 1.

"Web Image—Globus MDS InfoBrowser, Splib component, sp01.ucs.indiana.edu," obtained from http://www.extreme.indiana.edu/cat/screenshots/cat-n-infob.gif, generated Oct. 6, 2009, p. 1.

"CAT screenshots," obtained from http://www.extreme.indiana.edu/cat/screenshots/index.html, dated Jan. 23, 1999, p. 1.

"Java—HPC++Interoperability," obtained from http://www.extreme.indiana.edu/hpc++2nexusrmi/index.html, dated Feb. 11, 1999, p. 1-3.

"Building HPC++Components," obtained from http://www.extreme.indiana.edu/cat/tutorial/hpc++/index.html, dated Jan. 28, 1999, p. 1.

"CAT Documentation," obtained from http://www.extreme.indiana.edu/cat/docs/index.html, dated Mar. 2, 2000, p. 1.

Juan Villacis, "A note on the Use of Java in Scientific Computing," Computer Science Dept. Indiana Univ., undated, p. 1-4.

Juan Villacis, "CAT: A High Performance, Distributed Component Architecture Toolkit for the Grid," Dept. of Computer Science, Indiana University, undated, p. 1-8.

Juan E. Villacis Jr., "A Component Architecture Toolkit," dated Dec. 1999, p. 1-135.

"Working With Quartz Composer" (published Feb. 13, 2006 at http://developer.apple.com/graphicsimaging/quartz/quartzcomposer.html), pp. 1-11.

"Quartz Composer Programming Guide" (published Jul. 24, 2006), pp. 1-80.

\* cited by examiner

GRAPHICAL MOTION COMPOSITION FILES AND METHODS FOR FORMATTING AND ORGANIZATION THEREOF

FIELD OF THE INVENTION

Embodiments of the invention relate to graphical motion composition files and methods for the formatting and the organization of such files to promote easier sharing and screening of such files.

BACKGROUND

It is known in the art of computer graphics to create motion graphics programs called "compositions." Compositions are a relatively simple way in which a user can intuitively create motion graphical effects (such as a moving background, flashing text, etc.) without extensive knowledge of how to program a computer. An exemplary program that allows for the creation of composition files is known as the Quartz Composer™, manufactured by Apple Computer, Inc. Further information concerning the Quartz Composer can be found in the following documents, copies of which are filed with the Information Disclosure Statement filed with this disclosure, and which are incorporated by reference herein. "Working With Quartz Composer" (published Feb. 13, 2006 at http://developer.apple.com/graphicsimaging/quartz/quartzcomposer.html); "Quartz Composer Programming Guide" (published Jul. 24, 2006).

Quartz Composer is based on and brings together several graphical and non-graphical technologies, such as Quartz 2D, Core Image, Core Video, OpenGL, QuickTime, MIDI System Services, and Real Simple Syndication. As a result, once created, compositions can be incorporated into any number of applications, such as iPhoto, iMove, iChat, PhotoBooth, Final Cut Pro, screen savers, etc.

Figure 1:
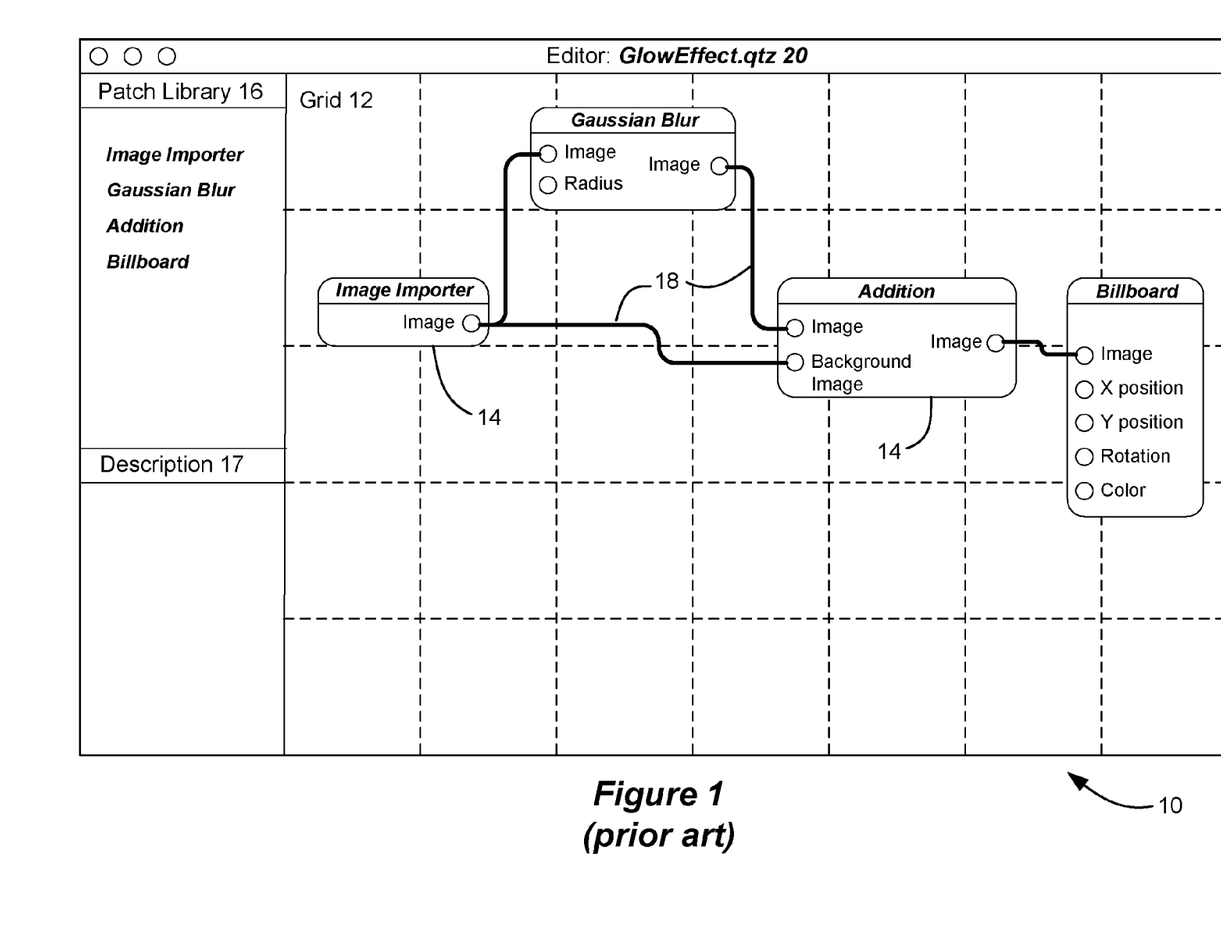
FIG. 1 shows the creation of a composition file in accordance with the prior art.

When creating a composition file 20, and as shown in FIG. 1, the editor portion 10 of the Quartz Composer program contains a grid 12 for assembling and connecting "patches" 14, which are selected from a library 16. Patches 14 are like functions, and may take input parameters (the left side of the patches) and provide output results (the right side of the patches). Within the editor 10, patches 14 can be visually connected together by links 18 to create a composition (Comp1.qtz) which essentially defines the data flow or the manner in which graphical motion data is processed by the composition.

Consider the exemplary composition illustrated in FIG. 1. As shown, four patches 14 have been selected from the library. Each of these patches 14 performs a function, and together the overall effect of the composition provides a "glow effect" applied to an input image. Thus, patch "Image Importer" generates a bitmap image from a source file (such as a JPEG or BMP file); patch "Gaussian Blur" blurs an image by an amount specified by a definable radius; patch "Addition" adds the blurred image to the original bitmap image to superimpose the two; and patch "Billboard" renders the final image on the user's screen. Of course, composition files can also be used to manipulate video (i.e., motion graphics), which constitutes a series of images.

Figure 2:
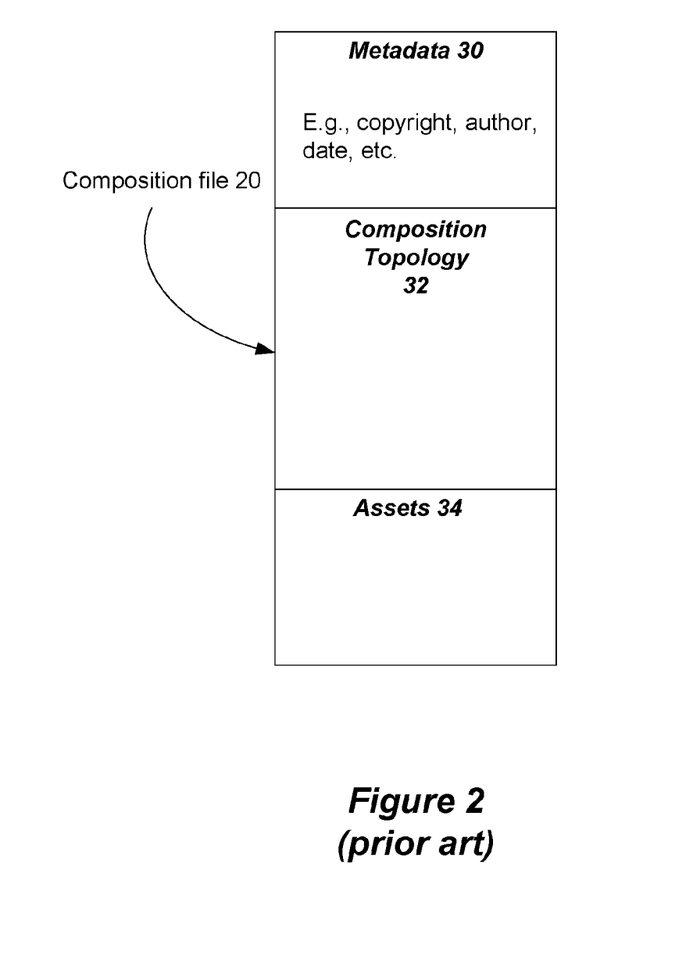
FIG. 2 shows the basic data structure of a composition file in accordance with the prior art.

The composition file 20, shown in further detail in FIG. 2, is typically constructed of metadata 30 having the header information for the file (such as copyright information, author name, creation date, etc.); the topology of the composition 32 as defined by the patches 14 and links 18; and any assets 34 (data) necessary to the composition (such as a corporate logo or other data structures).

Figure 3:
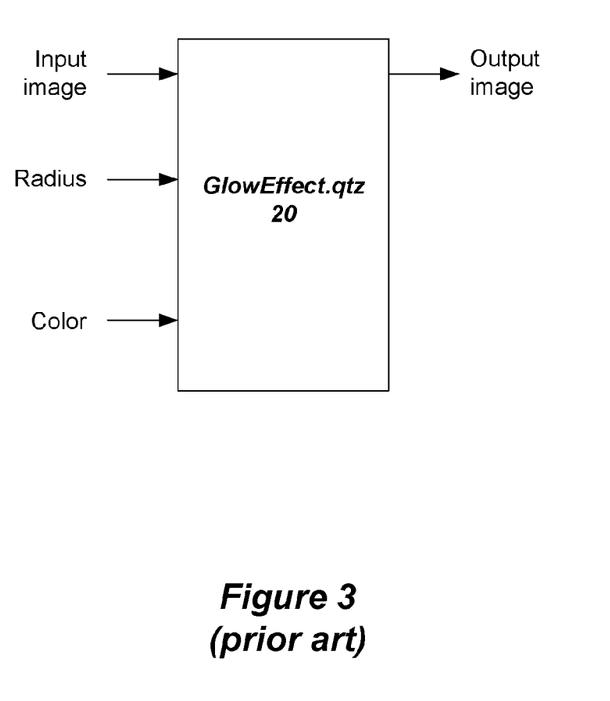
FIG. 3 shows the inputs and outputs of a composition file in accordance with the prior art.

So constructed, a composition file 20, like the patches 14 from which it is created, may have various inputs and outputs as well. This is illustrated in FIG. 3, which shows a simplification of the exemplary "glow effect" composition file 20 of FIG. 1. As shown, the composition file 20 ultimately receives an input image and produces an output image. However, because the various patches 14 specify other various inputs, other inputs can be present as well. For example, patch "Gaussian Blur" allows the user to specify a radius; patch "Billboard" allow a user to specify color, etc., of the resulting output image. A user can enter values for such other inputs during the creation or editing of the composition, such as by mousing over the input in question (e.g., radius) and typing in an appropriate number. Otherwise, default values can be automatically populated for those inputs. (Note that other patch inputs such as "X and Y Position" and "Rotation" are not shown as inputs to the composition file 20 because of their minor significance in the mind of the designer of the composition file. In other words, the designer in this example has configured the composition file such that X and Y position and Rotation are not modifiable by the end user.).

A benefit of the Quartz Composer format is the ease with which a user can quickly create a relatively complicate graphical composition. However, that same complexity makes it rather difficult for one user to use the compositions of another. This is because, as just noted with respect to FIG. 3, different compositions will have different input and output characteristics depending on which patches 14 have been used to create the composition. Suppose a user is considering several composition files 20 (*.qtz) present on his company's server, and is considering whether or not they would be of use to his current graphical project. Such a user cannot know absent trial and error which composition files 20 might be suitable for his graphical project. For example, a user might be trying to manipulate an image, and accordingly any compositions missing image inputs would be inapplicable to that user. But such an inconsistency would not be known to the user until he tried to use this file and realized that the selected composition file was unsuitable for his project.

A solution to this problem is therefore desirable, and is provided in this disclosure.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

A method and data structure for improving the utility of graphics compositions is disclosed. In one embodiment, composition files are created through the connection of patches in a composition editor. Included with the created composition file is protocol information. Preferably such protocol information is included as metadata in the header of the composition file, and can be constructed in any suitable fashion. So constructed, composition files can be grouped together in a physical or virtual repository accessible to other application programs. Another user can then pick an appropriate composition for a new project based on review and filtering of the protocols as contained in the header information of the repositoried composition files. Such review and filtering can be accomplished using a composition picker user interface in the user's application program. The repository can then be queried for composition files matching or otherwise compatible with the specified protocol.

Figure 4:
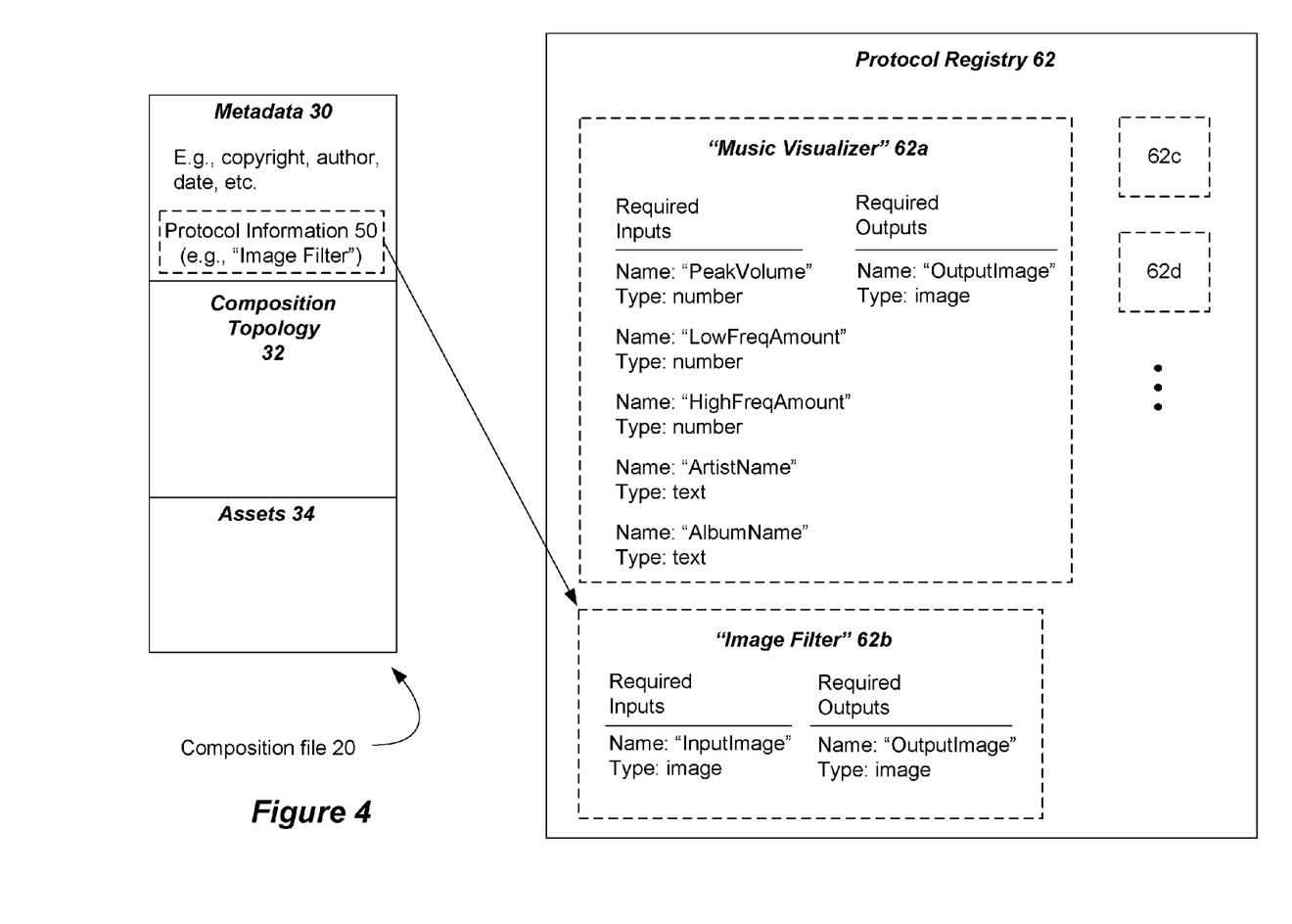
FIG. 4 shows the basic data structure of a composition file in accordance with an embodiment of the invention, which includes protocol information in the file's metadata reflective of the format of the file.

FIG. 4 shows the basic format of a composition file 20 in accordance with one embodiment of the invention. As shown, the format is largely the same as shown in FIG. 2, but includes protocol information 50 as part of the metadata 30 header. Such protocol information 50 reflects a convention which ultimately reflects the number and formats of input and output characteristics of the composition file 20 as explained below. For example, shown in FIG. 4 is the protocol "Image Filter," which, as will be explained below, ultimately specifies that the composition file applies an effect to a source image in order to produce a modified or new image.

The protocols 50 provide a standardized way of making a call to a protocol registry 62, which actually contains the records concerning the number, name, and format of the inputs and outputs. Thus, as shown, registry entry 62b, corresponding to protocol "Image Filter," specifies a single input and a single output, each taking the format of an image. Registry entry 62a, corresponding to protocol "Music Visualizer," is more complex, and involves a visual way to represent music on a user's screen. It receives as inputs an instantaneous peak volume (in the format of a number); a quantified amount of low and high frequency energy (a number); and artist name and album name (in the format of text). As further specified, that protocol outputs an single image which essentially pulsates to the beat of the music, and which displays the artist and album particulars. In short, the protocol registry entries, at a minimum, specify the primary information necessary to composition file compatibility, namely name, format, and number of inputs and outputs.

However, the protocol 50 does not restrain the composition files 20 that conform to it to have only those primary inputs and outputs; other secondary inputs are permissible. In the example of FIG. 3, such secondary inputs might include the radius used in the Gaussian filter and the color of the output image. Such inputs and outputs are secondary in that they could be of benefit to a user to review and consider when picking a composition file, and may have to be edited by the user if the composition file is picked, but is not critical to compatibility with the user's graphical project. In short, while such secondary inputs and outputs can be of help to the composition file designer in creating a more powerful, flexible, parametrizable, and configurable composition file, they are merely secondary and not critical to compatibility with end users graphical projects.

The entries in the protocol registry 62 can additionally specify other additional information not significant to the issue of compatibility, for example, a textual description of the protocol suitable for displaying in a user interface.

One skilled in the art of computer programming will appreciate that the protocol information 50 and protocol registry 62 can be coded in any number of suitable manners, such as by using forms of extensible markup language, etc. The manner in which such coding occurs is therefore not of particular importance to embodiments of the invention. The protocol information 50 is typically populated by the file editor concurrent with the creation of the composition file 20.

Figure 5:
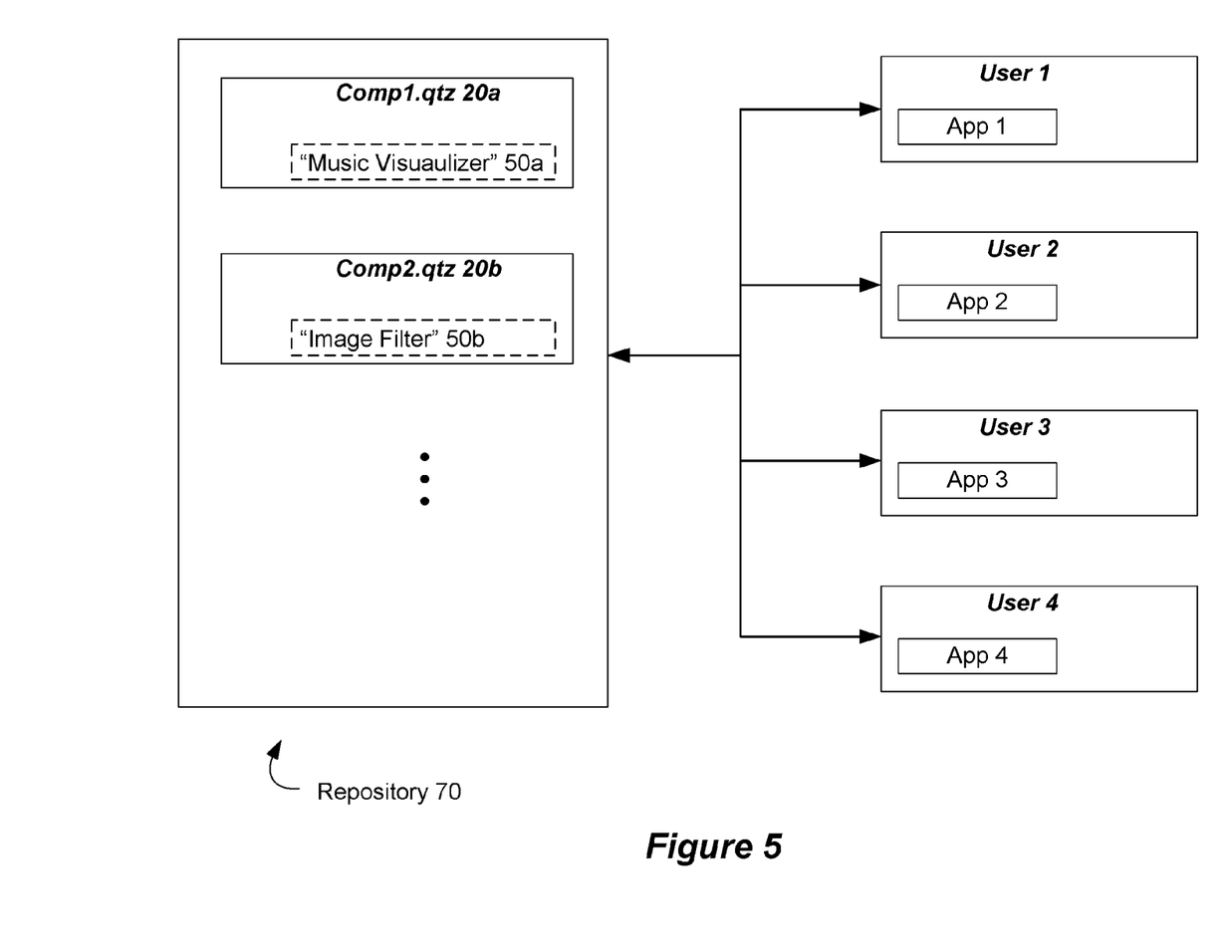
FIG. 5 shows several of the composition files of FIG. 4 in a repository, and the ability of user to query those files from different applications.

In any event, the protocol 50 of the composition file 20 allows various users' composition files to be queried, reviewed, and (if suitable) used by other users. Such querying by other users can be conveniently accomplished when the composition files 20 are centrally located in a repository 70, as is shown in FIG. 5. Such a repository 70 can be physical or virtual. In one example, all composition files 20 can be stored in a particular directory in on a particular system (e.g., in directory "Library/Quartz Composition Files"). However, in other applications, accessible composition files 20 need not be commonly located, but instead can be marshaled for review by a suitable search engine (e.g., one that searches for all *.qtz files on a system).

As shown in FIG. 5, the repository 70 of composition files 20 is accessible by any of a plurality of users on the system. As shown, each user runs an application ("App x") which is capable of rendering and/or editing the composition files. As discussed earlier, the number of different application able to access the composition files 20 can be numerous, especially when a flexible format like Quartz Composer is used.

Once added to the repository 70, the composition file 20 is assigned a unique identifier in the form of a unique text string. This allows the composition file 20 to be reliably and persistently identified independent of the client application or of the computer. The identifier remains identical even if the composition file is moved to a new location within the repository, or installed in a repository on a different computer. A unique identifier also allows a client application program to refer directly to the composition file in the repository, and further provides to the client application a simple mechanism for remembering a previously-selected composition file 20 (e.g., for use as a default) without having to keep a copy of the actual composition file.

Figure 6:
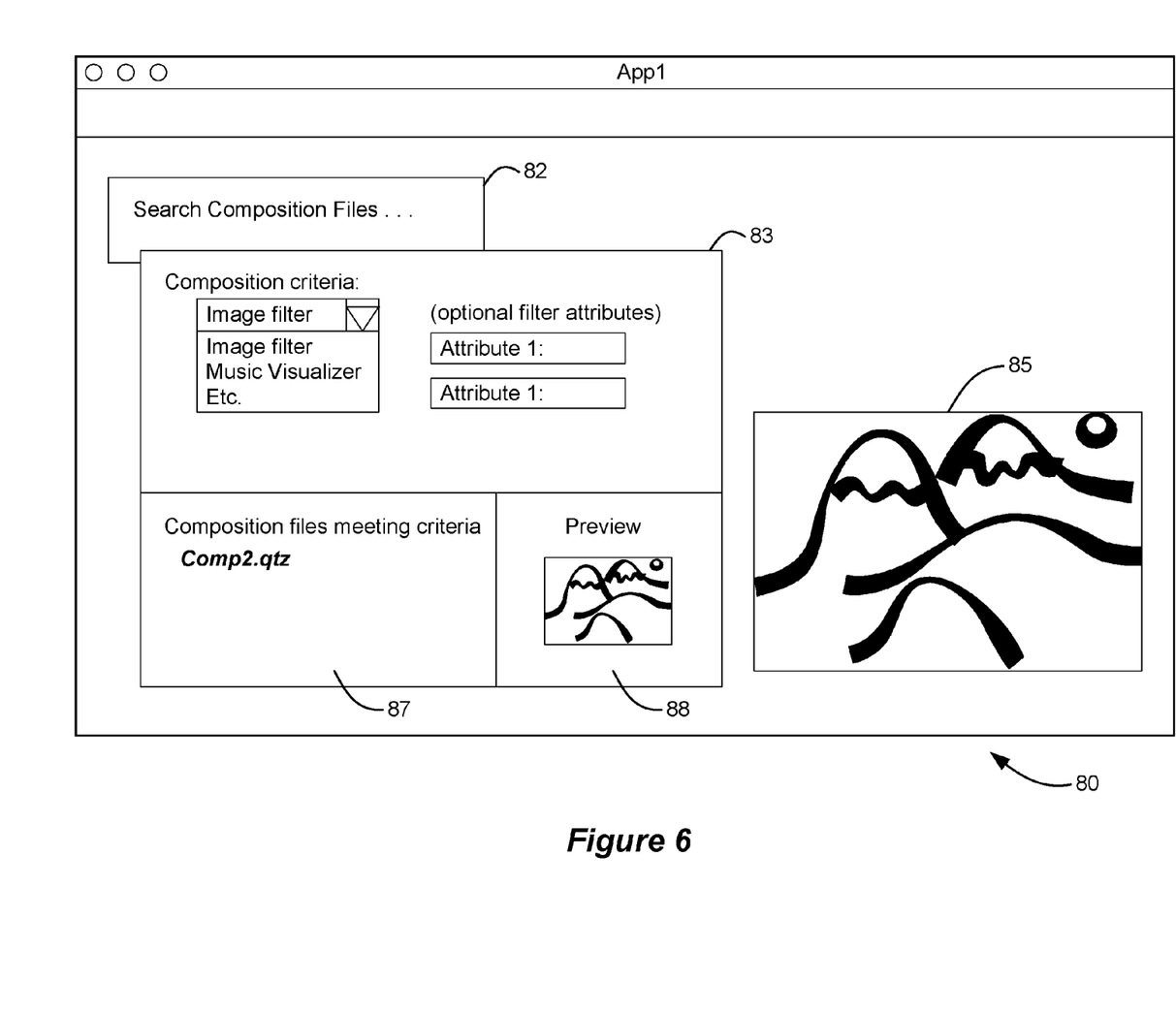
FIG. 6 shows a user's application program and shows a composition picker user interface for selecting a compatible composition file from the repository of FIG. 5.

FIG. 6 illustrates one user's application program 80, and shows the manner in which the protocol information 50 in the composition files 20 can be used to quickly sort out composition files of interest in the repository 70. Shown in the application 80 is a particular graphical project 85, in this case an image. Suppose the user wishes to manipulate that image to produce a different-looking output image, for example, by applying some sort of filter to the image. To so manipulate the file, the user can access the menu structure of the application 80 (not shown) to ultimately access or incorporate 82 composition files 20 present in the repository 70 (or elsewhere on the system if a search engine is used).

However, realizing that composition files 20 can be varied in nature, with different usage models and inputs and outputs, the composition files 20 in the repository 70 are queried for those that are compatible with the graphical project 85. In this regard, the user can be presented with composition picker user interface 83 for choosing a suitable composition file 20. As shown, the user can select the criteria ("image filter," "music visualizers," etc.) for the composition files he wishes to review, which is used to query the repository 70 for suitable compositions files 20. In this regard, note that the composition criteria as specified in the applications program corresponds with the protocol information 50 discussed earlier during the creation of the composition files 20. This allows the composition criteria to be compared against the protocol information 50 to select suitable composition files 20 for the user's consideration.

Assuming the composition criteria as shown, and referring again to the composition files 20 of FIG. 5, it is seen that a comparison of the composition criteria and the protocol information 50 for each of the files 20 has yielded a match (file "comp2.qtz"), which is displayed in a results window 87 in FIG. 6. Because this selected composition file 20 is necessarily compatible with the user's graphical project 85, a preview window 88 can be used to briefly display the effect the composition file will have on the project 85. Of course, if more than one composition file 20 is determined to be suitable, they too will be listed in the results window 87 for potential user selection.

To the extent a selected composition file 20 has other secondary inputs not critical to compatibility, default values can be used, or the user can be prompted to enter or edit such inputs either before or after application of the selected composition file 20 to his graphical project 85. Additionally, the composition picker 83 can also be used to filter the composition files returned (to results window 87) in other ways using the metadata 30 already typically present in a composition file. For example, the composition picker 83 as shown might provide an option or options for various attributes, such as author name (not shown), and thus return from the query only those composition files 20 authored by a particular person or organization. The application 80 can use a standard user interface picker program which is provided as a service along with the repository 70, or the application program can implement its own user interface picker. Indeed, if the process is automated, no picker may be needed at all.

While preferred embodiments of the invention have been disclosed, it should be understood that the embodiments as disclosed herein can be modified while still achieving the various advantages discussed herein. In short, it should be understood that the inventive concepts disclosed herein are capable of many modifications. To the extent such modifications fall within the scope of the appended claims and their equivalents, they are intended to be covered by this patent.

What is claimed is:

1. A method for formatting a graphical composition file, comprising:
    creating a composition, wherein the composition is formed by linking patches, wherein each patch has an interface including at least one of: at least one input, at least one output, and at least one input and at least one output, wherein each interface has a format, wherein linking patches comprises creating one or more data flow paths between any of the at least one inputs, the at least one outputs, and the at least one inputs and at least one outputs of the patches; and
    storing protocol information with the composition indicative of at least one of: the format of at least one input, the format of at least one output, and the format of at least one input and the format at least one output for the composition, the protocol information providing information for querying a protocol registry.

2. The method of claim 1, wherein the protocol information comprises a name, and wherein the protocol information is indicative of the format for the composition via the protocol registry.

3. The method of claim 2, wherein the protocol registry comprises the name of the protocol and the format for the composition.

4. The method of claim 1, further comprising storing the composition file in a composition file repository.

5. The method of claim 1, wherein the patches are graphically represented by their interface in an editor program.

6. The method of claim 1, wherein the protocol information provides information for calls to the protocol registry.

7. The method of claim 1, wherein the format comprises one image or a series of images.

8. The method of claim 1, comprising creating a data structure for the graphical composition file, the data structure comprising:
    a composition topology for a graphical motion file, wherein the composition topology is formed by the linked patches; and
    metadata, wherein the metadata comprises the protocol information.

9. The method of claim 8, wherein the protocol information comprises a name, and wherein the protocol information is indicative of the format for the composition via the protocol registry.

10. The method of claim 9, wherein the protocol registry comprises the name of the protocol and the format for the composition.

11. The method of claim 8, wherein the protocol information provides information for calls to the protocol registry.

12. The method of claim 8, wherein the format comprises one image or a series of images.

13. A non-transitory memory storage device having instructions stored thereon for causing a programmable computer to perform the method of claim 1.

14. The non-transitory memory storage device of claim 13, wherein the creation occurs within an editor program and wherein the protocol information points to the protocol registry entry.

15. A method for formatting a graphical composition file, comprising:
    creating within an editor program a composition, wherein the composition is formed by linking patches, wherein each patch has an interface including at least one of at least one input, at least one output, and at least one input and at least one output, wherein each interface has a format, wherein linking patches comprises creating one or more data flow paths between any of the at least one inputs, the at least one outputs, and the at least one inputs and at least one outputs of the patches; and
    storing protocol information with the composition, wherein the protocol information points to a protocol registry entry which indicates of at least one of: the format of at least one input, the format of at least one output, and the format of at least one input and the format of at least one output for the composition, the protocol information providing information for querying the protocol registry.

16. The method of claim 15, wherein the patches are graphically represented by their interface in the editor program.

17. The method of claim 15, comprising creating a data structure for the graphical composition file, the data structure comprising:
    a composition topology for a graphical motion file, wherein the composition topology is formed by the linked patches; and
    the protocol information pointing to the protocol registry entry.

18. The method of claim 17, wherein the protocol information comprises a name.

19. The method of claim 18, wherein the protocol registry comprises the name of the protocol and the format for the composition.

20. A method for choosing a graphical composition file to process a graphical project in an application program, comprising:

specifying composition criteria for the graphical project, wherein composition criteria comprises at least one format of the graphical project;

querying at least one composition file using the composition criteria, wherein the at least one composition file comprise protocol information indicative of at least one of: a format of at least one input, a format of at least one output, and a format of at least one input and a format of at least one output for the composition, the protocol information providing information for querying a protocol registry;

comparing the composition criteria with the protocol information to determine which of the at least one composition files has at least one format, as indicated by the protocol information, that is compatible with the at least one format of the graphical project, as specified in the composition criteria; and permitting the compatible composition files to modify the graphical project.

21. The method of claim 20, wherein the protocol information comprises a name, and wherein the protocol information is indicative of the format for the composition via the protocol registry.

22. The method of claim 21, wherein the protocol registry comprises the name of the protocol and the format for the composition.

23. The method of claim 20, wherein the protocol information provides information for calls to the protocol registry.

24. The method of claim 20, wherein the format comprises one image or a series of images.

25. A non-transitory memory storage device having instructions stored thereon for causing a programmable computer to perform the method of claim 20.

26. A method for choosing a graphical composition file to process a graphical project in an application program, comprising:

specifying protocol information for the graphical project, where the protocol information is indicative of at least one of: a format of at least one input, a format of at least one output, and a format of at least one input and a format of at least one output for the composition, the protocol information providing information for querying a protocol registry;

querying at least one composition file in a repository using the protocol information, the at least one composition file having a format;

determining from the protocol information which of the at least one composition files have a format that is compatible with a format indicated by the protocol information specified for the graphical project; and permitting the compatible composition files to modify the graphical project.

27. The method of claim 26, wherein the protocol information comprises a name, and wherein the protocol information is indicative of the format for the composition via the protocol registry.

28. The method of claim 27, wherein the protocol registry comprises the name of the protocol and the format for the composition.

29. The method of claim 26, wherein the protocol information provides information for calls to the protocol registry.

30. The method of claim 26, wherein the format comprises one image or a series of images.

31. A non-transitory memory storage device having instructions stored thereon for causing a programmable computer to perform the method of claim 26.

32. A device comprising:
a repository configured to store one or more compositions and corresponding protocol information; and
a processor programmed to:
create a composition, wherein the composition is formed by linking patches, wherein each patch has an interface including at least one of: at least one input, at least one output, and at least one input and at least one output, wherein each interface has a format, wherein linking patches comprises creating one or more data flow paths between any of the at least one inputs, the at least one outputs, and the at least one inputs and at least one outputs of the patches; and
store in the repository protocol information with the composition indicative of at least one of: the format of at least one input, the format of at least one output, and the format of at least one input and the format at least one output for the composition, the protocol information providing information for querying a protocol registry.

33. A device comprising:
a processor programmed to:
specify composition criteria for a graphical project, wherein composition criteria comprises at least one format of the graphical project;
query at least one composition file using the composition criteria, wherein the at least one composition file comprises protocol information indicative of at least one of: a format of at least one input, a format of at least one output, and a format of at least one input and a format of at least one output for the composition, the protocol information providing information for querying a protocol registry;
compare the composition criteria with the protocol information to determine which of the at least one composition files has at least one format, as indicated by the protocol information, that is compatible with the at least one format of the graphical project, as specified in the composition criteria; and
permit the compatible composition files to modify the graphical project.

34. A device comprising:
a processor programmed to:
specify protocol information for a graphical project, where the protocol information is indicative of at least one of: a format of at least one input, a format of at least one output, and a format of at least one input and a format of at least one output for the composition, the protocol information providing information for querying a protocol registry;
query at least one composition file in a repository using the protocol information, the at least one composition file having a format;
determine from the protocol information which of the at least one composition files have a format that is compatible with a format indicated by the protocol information specified for the graphical project; and
permit the compatible composition files to modify the graphical project.

* * * * *

UNITED STATES PATENT AND TRADEMARK OFFICE
CERTIFICATE OF CORRECTION

PATENT NO.        : 8,650,541 B2                                             Page 1 of 1
APPLICATION NO.   : 11/462667
DATED             : February 11, 2014
INVENTOR(S)       : Pierre-Olivier Latour It is certified that error appears in the above-identified patent and that said Letters Patent is hereby corrected as shown below:

In the Claims:

Column 6, Claim 15, line 43, after the word "indicates" delete the word "of".
Column 7, Claim 20, line 2, replace "comprises" with --comprise--.
Column 7, Claim 20, line 6, replace "comprise" with --comprises--.
Column 7, Claim 26, line 48, replace "have" with --has--.
Column 8, Claim 32, line 20, after "the format of at least one input and the format" insert the word --of--.
Column 8, Claim 33, line 27, replace "comprises" with --comprise--.
Column 8, Claim 34, line 58, replace "have" with --has--.

Signed and Sealed this
Sixth Day of May, 2014

Michelle K. Lee
*Deputy Director of the United States Patent and Trademark Office*